Patented Aug. 13, 1929.

1,724,679

UNITED STATES PATENT OFFICE.

GEORGE W. PRATHER, OF DENVER, COLORADO.

PROCESS FOR PREPARING WATER-SOFTENING MATERIAL.

No Drawing. Original application filed August 10, 1916, Serial No. 114,271, now Patent No. 1,636,942. Divided and this application filed July 15, 1927. Serial No. 206,140.

My invention relates to a process for preparing a water softening material.

My present application is a division of my application filed August 10, 1916, Serial No. 114,271, for a process for treating a natural zeolite-like substance to render it capable of softening water.

In carrying out my invention a mineral, which has for its base a hydrated silicate of aluminum, containing a small amount of impurities and some moisture, is reduced to about the size of an English walnut, placed in a 10% salt solution at a temperature of about 200 degrees Fahrenheit; kept there for about two hours, and is then placed on driers and allowed to dry in the open air for about 30 days, or until practically all the uncombined moisture is driven off. The material is then dried by artificial heat until the remainder of the moisture is driven off.

The material is subsequently reduced to particles of suitable size by mechanical means, and an alkali metal compound is added and mixed therewith. The mixture is then baked in an oven or furnace at a high temperature until the mineral is hard enough to resist the powdering action of water. During the baking, the alkali metal compound melts and thoroughly permeates the particles of mineral. Finally the mineral is washed free of excess alkali compound and is then dumped into a vat of salt water and stored there. Suitable alkali metal compounds for incorporating in the mineral are the hydroxides of potassium and sodium and the carbonates of potassium and sodium, or a mixture of two or more of such compounds.

I find that the desired results may likewise be secured by taking the natural zeolite-like substance, having for its base a hydrated silicate of aluminum containing a small amount of impurities and some moisture, and drying the same at a low temperature either in the air by the heat of the sun or by artificial heat until all of the uncombined water is removed, after which the material is baked at a high temperature in an oven or furnace until the mineral is hard enough to resist the powdering action of water. The mineral is then dumped into a vat of salt water and stored there.

Either of the above described treatments of the material renders it granular and porous and of such a nature that it is highly efficient as a water softener. The material, while stored in the salt water, gives off such calcium and magnesia as is contained therein. It is then capable of absorbing from any water passed through it all calcium and magnesia contained in the water, and leaving a pure, softened water.

After the mineral has absorbed all the calcium and magnesia salts that it is capable of absorbing, said salts may be removed from the mineral by treating the same with a solution of salt water, thereby restoring the mineral to its full capacity for softening water. Since the calcium and magnesia taken up by the mineral may be thus removed, and since the treatment given the mineral renders it nonreducible under the action of water, it follows that the life of the mineral is very great.

My invention further contemplates the boiling of the mineral in the initial salt solution, and then contemplates the storing of the mineral in a dry condition instead of in salt water, where desired.

Having described my invention what I claim is new and desire to protect by Letters Patent is:

1. The process for forming a filtering and water softening material which consists in drying a mineral having for its base a hydrated silicate of aluminum until practically all the uncombined moisture is driven off, reducing such mineral to particles of suitable size for use in granular bed filters by mechanical means, then baking such mineral at a high temperature in the presence of an alkali metal carbonate until the carbonate melts and thoroughly permeates the mineral and the particles are rendered hard, and finally washing the mineral free of excess of the carbonate employed.

2. The process for forming a filtering and water softening mineral which consists in drying a mineral having for its base a hydrated silicate of aluminum until practically all the uncombined moisture is driven off, reducing such mineral to particles of suitable size for use in granular bed filters, by mechanical means, then baking such mineral at a high temperature in the presence of sodium carbonate until said carbonate melts and thoroughly permeates the mineral, and finally washing the mineral free of excess of sodium carbonate.

3. The process for forming a filtering and water softening material from a suitable mineral which consists in reducing said mineral to particles of suitable size for use in a granular bed filter by mechanical means, then adding an alkali metal carbonate to the mineral particles, and baking the mixture at a temperature sufficiently high to render the particles hard enough to resist the powdering action of water, and finally washing the particles free of excess carbonate of the alkali metal.

4. The process for forming a filtering and water softening material from a natural silicate mineral which consists in reducing said mineral to particles of suitable size for use in granular bed filters by mechanical means, then adding sodium carbonate to the mineral particles, and baking the mixture at a temperature sufficiently high to liquify the carbonate and render the particles hard enough to resist the powdering action of water, and finally washing the particles free from excess sodium carbonate.

5. The process for forming a filtering and water softening material from natural silicates of aluminum which consists in mixing with said silicates an alkali metal compound other than sodium hydroxide, and baking the mixture at a temperature sufficiently high to liquify the alkali metal compound and cause it to permeate said silicates, and sufficiently high to render the material hard enough to resist the powdering action of water, and finally washing the material free from excess alkali metal.

6. The process for forming a filtering and water softening material from a suitable mineral which consists in mixing with said mineral a non-acid, soluble alkali metal compound and baking the mixture at a temperature sufficiently high to liquify the alkali metal compound and cause it to permeate the material, and sufficiently high to render the material hard enough to resist the powdering action of water, and finally washing the material free from excess alkali metal.

In testimony whereof, I have hereunto signed my name to this specification.

GEORGE W. PRATHER.